(12) United States Patent
Shoshan

(10) Patent No.: US 9,930,026 B2
(45) Date of Patent: Mar. 27, 2018

(54) ENCRYPTION/DECRYPTION IN A CLOUD STORAGE SOLUTION

(71) Applicant: Itzhak Shoshan, Even Yuhuda (IL)

(72) Inventor: Itzhak Shoshan, Even Yuhuda (IL)

(73) Assignee: SAP SE, Walldorf (DE)

( * ) Notice: Subject to any disclaimer, the term of this patent is extended or adjusted under 35 U.S.C. 154(b) by 362 days.

(21) Appl. No.: 14/518,055

(22) Filed: Oct. 20, 2014

(65) Prior Publication Data

US 2016/0344724 A1    Nov. 24, 2016

(51) Int. Cl.
| G06F 21/00 | (2013.01) |
| H04L 29/06 | (2006.01) |
| H04L 29/08 | (2006.01) |
| G06F 21/60 | (2013.01) |

(52) U.S. Cl.
CPC ...... H04L 63/0815 (2013.01); H04L 63/0428 (2013.01)

(58) Field of Classification Search
CPC ............. H04L 63/0823; H04L 63/0457; H04L 63/0815; H04L 63/0428
See application file for complete search history.

(56) References Cited

U.S. PATENT DOCUMENTS

| 7,970,829 B2 | 6/2011 | Shoshan |
| 8,117,317 B2 | 2/2012 | Klimentiev et al. |
| 8,132,008 B2 | 3/2012 | Fisher et al. |
| 8,140,866 B2 | 3/2012 | Becker et al. |
| 8,631,230 B2 | 1/2014 | Manges |
| 8,705,746 B2 | 4/2014 | Meijer et al. |
| 8,707,023 B2 | 4/2014 | Nagel et al. |
| 2002/0021804 A1 | 2/2002 | Ledzius et al. |
| 2004/0093419 A1 | 5/2004 | Weihl et al. |
| 2007/0039053 A1 | 2/2007 | Dvir |
| 2012/0210118 A1 | 8/2012 | Chaves et al. |
| 2013/0039360 A1 | 2/2013 | Manian et al. |
| 2013/0061310 A1 | 3/2013 | Whitmyer, Jr. |
| 2013/0117557 A1 | 5/2013 | Park et al. |

(Continued)

FOREIGN PATENT DOCUMENTS

GB    2509709 A  *  7/2014  ......... H04L 63/0227

OTHER PUBLICATIONS

Hemayamini Kurra, Youssif Al-Nashif, Salim Hariri; "Resilient cloud data storage services"; Aug. 2013; CAC '13: Proceedings of the 2013 ACM Cloud and Autonomic Computing Conference; Publisher: ACM; pp. 1-9.*

*Primary Examiner* — Kambiz Zand
*Assistant Examiner* — Courtney Fields
(74) *Attorney, Agent, or Firm* — Fish & Richardson P.C.

(57) ABSTRACT

The disclosure generally describes computer-implemented methods, software, and systems, including a method for decryption of data stored in the cloud. A record is received from a cloud storage solution, wherein at least one data field in the received record is encrypted, and wherein each encrypted data field is associated with an encrypted field identifier. A client certification key associated with a user accessing the record and at least one encrypted field identifier are provided to a security server. At least one decryption key associated with at least one of the at least one encrypted field identifier is received. Using each of received decryption key, at least one encrypted data field is decrypted. The received record is presented to the user accessing the record.

18 Claims, 3 Drawing Sheets

(56) References Cited

U.S. PATENT DOCUMENTS

| | | |
|---|---|---|
| 2014/0006075 A1 | 1/2014 | Shoshan et al. |
| 2014/0122866 A1 | 5/2014 | Haeger et al. |
| 2014/0201524 A1 | 7/2014 | Dittrich |
| 2014/0331060 A1* | 11/2014 | Hayton .................. G06F 21/31 713/186 |
| 2015/0365382 A1* | 12/2015 | Balakrishnan ...... H04L 63/0428 713/168 |

* cited by examiner

ENCRYPTION/DECRYPTION IN A CLOUD STORAGE SOLUTION

BACKGROUND

The present disclosure relates to computer-implemented methods, software, and systems for encryption of data in the cloud.

Users can store data in the cloud, e.g., rather than in local storage, such as at the user's computer or in external storage. Data that is stored in the cloud can include, for example, a file containing personal or sensitive information that is encrypted, such as using encryption operations performed at the cloud. When the user wants access to the data, the cloud can decrypt the file using an encryption key stored at the cloud and provide a decrypted version of the file to the user. In some implementations, the cloud, in addition to storing the user's data, can also store encryption and decryption keys that can be provided to the user for encryption and decryption of the file.

SUMMARY

The disclosure generally describes computer-implemented methods, software, and systems for encryption and decryption of data stored in the cloud. For example, a record is received from a cloud storage solution. At least one data field in the received record is encrypted, and each encrypted data field is associated with an encrypted field identifier. A client certification key associated with a user accessing the record and at least one encrypted field identifier are provided to a security server. At least one decryption key associated with at least one of the at least one encrypted field identifier is received. Using each of the at least one decryption key, at least one encrypted data field is decrypted. The received record, including the decrypted data field, is presented to the user accessing the record.

The present disclosure relates to computer-implemented methods, software, and systems for encryption and decryption of data stored in the cloud. One computer-implemented method includes: receiving a record from a cloud storage solution, wherein at least one data field in the received record is encrypted, and wherein each encrypted data field is associated with an encrypted field identifier; providing a client certification key associated with a user accessing the record and at least one encrypted field identifier to a security server; receiving at least one decryption key associated with at least one of the at least one encrypted field identifier; decrypting, using the at least one decryption key, at least one encrypted data field; and presenting received record to user.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect, combinable with any of the previous aspects, the client certification key corresponds to a single sign-on (SSO) authorization, wherein the SSO authorization allows access to the received record from the cloud storage solution.

In a second aspect, combinable with any of the previous aspects, the client certification key associated with the user accessing the record provides authorized access to fewer than all of the encrypted data fields within the record, and wherein presenting the received record to the user accessing the record includes presenting at least one data field without decrypting the at least one data field.

In a third aspect, combinable with any of the previous aspects, the security server performs one or more operations, including: determining, for each encrypted field identifier, whether the user associated with the client certification key is authorized to view the decrypted contents of the corresponding encrypted data field; and providing, for each encrypted field identifier for which the user associated with the client certification key is authorized, a decryption key associated with the encrypted field identifier.

In a fourth aspect, combinable with any of the previous aspects, the record is received at a client system, wherein the client system is associated with a local program coordinating access with the security server.

In a fifth aspect, combinable with any of the previous aspects, the local program is a client browser plug-in, wherein the client browser plug-in is operable when executed to communicate with the security server and decrypt the encrypted field associated with each encrypted field identifier for which an associated decryption key is received.

In a sixth aspect, combinable with any of the previous aspects, the determination of whether the user associated with the client certification key is authorized to view the decrypted contents of an encrypted data field is based on the client certification key of the user being associated with at least one of a role of the user, a pre-defined authorization, the user's region, or the user's membership in a group, family, team, or department, or one or more of the user's role, education, certification, or location.

In a seventh aspect, combinable with any of the previous aspects, a first encrypted data field is authorized for access by a first user, and a different second encrypted data field is authorized for access by a different second user.

In an eighth aspect, combinable with any of the previous aspects, a level of encryption associated with user access for the record is set using inputs from an administrator or a record keeper.

In a ninth aspect, combinable with any of the previous aspects, presenting the received record to the user includes, when the user does not have authorization to see a particular data field, presenting a placeholder field value in lieu of encrypted information.

In a tenth aspect, combinable with any of the previous aspects, the method further comprises identifying a record to be stored in the cloud; identifying settings associated with the record, including which of the fields are to be encrypted and using which particular keys; providing, to the security server, a client certification key for encryption; receiving, from the security server, an encryption key based on the client certification key and an authorization to encrypt; encrypting particular fields prior to storage in the cloud; and sending the record to the cloud for storage.

In an eleventh aspect, combinable with any of the previous aspects, the method further comprises determining that an update has occurred on a field value in the record, encrypting the field value, and sending the record to the cloud storage solution for storage.

In a twelfth aspect, combinable with any of the previous aspects, the cloud storage solution encrypts the record in its entirety in the cloud.

The subject matter described in this specification can be implemented in particular implementations so as to realize one or more of the following advantages. First, increased security is provided for data stored in the cloud. For example, there is a separation between the stored data and the security (e.g., encryption keys) used to access the data, e.g., because the security is handled separately away from the stored data. Second, even if a hacker or an authoritative body has access to the encrypted data and all other resources available in the storage cloud, the data is useless, as the encryption keys are stored separately at a security server.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, software, and systems for storing and providing access to data stored in the cloud. For example, a user's data record can be stored in the cloud. Some of the fields can be encrypted. Access to the individual fields can be controlled, e.g., on a user basis or in other ways. For example, when the user requests the record, the entire record is provided by the cloud, including any encrypted fields. A browser plug-in executing on the user's computer, for example, can determine that some fields are encrypted. For each encrypted field, the browser plug-in can send, to a security server, an encrypted field identifier associated with the field, and a client certification key associated with the user. The security server, which is separate from the cloud, can perform user authentication using the received information. If the user is authorized to access the fields, then the security server can send decryption keys for each of the identified fields. The browser plug-in can use the decryption keys to decrypt the encrypted fields, and the data can be presented to the user.

Different types of information can be protected by the computer-implemented methods, software, and systems described herein. For example, protected information can include credit card information, sensitive data (e.g., Social Security numbers, account identifiers, passwords), trade secrets, intellectual property, biometric information, customer agreements, specific products/services that have been purchased, and personal information (e.g., names, phone numbers, addresses).

In some implementations, the computer-implemented methods, software, and systems can support various functions. For example, an entire record, though provided in its entirety for the purposes of aggregation with other records, can permit access to amounts, quantities and other non-sensitive information, but still prevent access to particular fields (e.g., customer's name, patient's name, and/or other personal information). In another example, classified information can be better protected, as access to the classified information can be facilitated at the field level, with access granted to specific users or security clearances. In another example, separate storage of access keys can allow a user to maintain the user's biometric information in a more secure way, e.g., to facilitate access to security zones.

Figure 1:
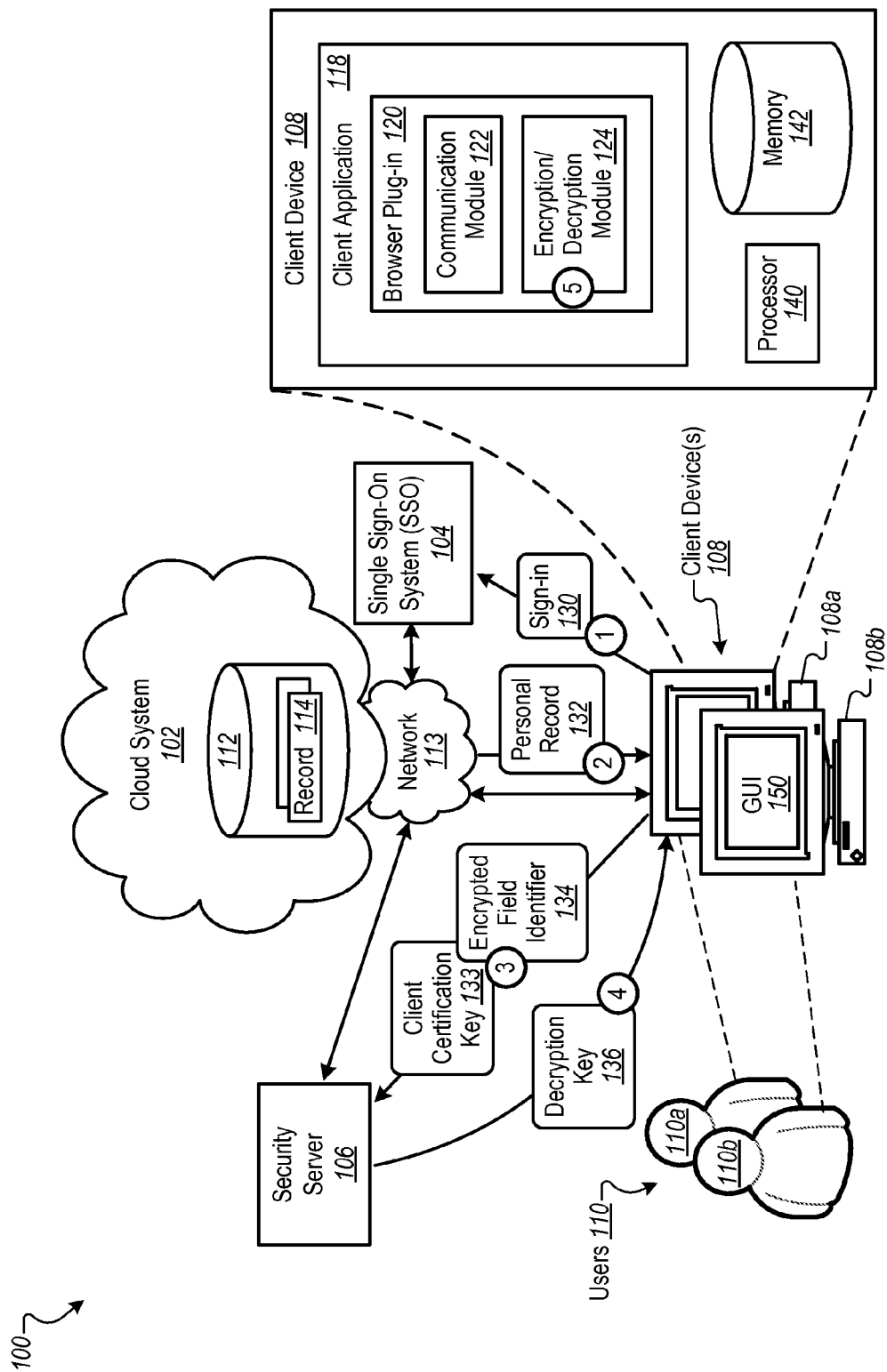
FIG. 1 is a block diagram illustrating an example environment for providing encryption and decryption of data stored in the cloud.

FIG. 1 illustrates an example environment 100 for providing encryption and decryption of data stored in the cloud. The environment 100 provides a cloud solution that, in addition to facilitating secure record storage, also provides a complete transactional and analytical system that enables customers to manage their encryption separately. Specifically, the illustrated environment 100 includes, or is communicably coupled with, a cloud system 102 for storing data, a single sign-on (SSO) system 104 for user sign-in, a security server 106 for providing security for cloud-stored data, and one or more client devices 108 associated with users 110. For example, the cloud system 102 can store data 112 in the cloud for users 110, access to which is controlled by the security server 106. A network 113 can communicatively connect the components of the environment 100. In some implementations, the SSO system 104 and the cloud system 102 can be combined, e.g., logically, such that when the user 110 signs into the SSO system 104, subsequent storage and retrieval of data 112 occurs seamlessly.

At a high level, the cloud system 102 comprises storage of encrypted and unencrypted data 112 for each of the users 110. The data 112 can include, for example, a plurality of records 114, each record 114 including one or more fields. Each field can be encrypted, e.g., for secure authorized access by one or more users 110. For example, for a particular record 114, one or more encrypted fields may be authorized for use by a user 110a, and one or more of the same or different fields may be authorized for use by a different user 110b. Specifically, different fields in the same record can have different security levels and access rights from each other. In some implementations, an administrator, a record keeper, or some other user can provide inputs to set up a level of encryption associated with user access of encrypted fields in each record 114. For example, the level of encryption (and associated certification/authentication information) can identify which users have access to which fields in a particular record 114, and the information can be stored with (or accessible to) the security server 106. In some implementations, users can decide on authorizations, for example, to encrypt/decrypt the data and make the data available to specific people (e.g., personal information accessible to specific users 110) or groups of people (e.g., for business-sensitive data accessible to groups of users, e.g., based on users having a certain role or capacity within an enterprise).

Components of the environment 100 can include electronic computing devices operable to provide encryption/decryption and authorized access to data stored in the cloud. As used in the present disclosure, the term "computer" is intended to encompass any suitable processing device. For example, although FIG. 1 illustrates a single instances of the cloud system 102, the SSO system 104, and the security server 106, the environment 100 can be implemented using two or more instances of the cloud system 102, the SSO system 104, and the security server 106, as well as computers other than servers, including a server pool. For example, components of the environment 100 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components of the environment 100 may be adapted to execute any operating system, including Linux, UNIX, Windows, Mac OS®, Java™, Android™, iOS or any other suitable operating system. According to some implementations, components of the environment 100 may also include, or be communicably coupled with, an e-mail server, a Web server, a caching server, a streaming data server, and/or other suitable server(s). In some implementations, components of the environment 100 may be distributed in different locations and coupled using the network 113.

The cloud system 102, for example, provides cloud security of client-side encrypted data. For example, encryption of user data does not occur in the cloud system 102, but rather occurs at particular ones of the client devices 108, depending on where the data originates. Client-side encryption and decryption, for example, can provide many features (e.g., advantages). For example, cloud customers can encrypt the data themselves, at a database table field level. For example, only users 110 can encrypt/decrypt the data in any particular field in the personal record 114. As such, the cloud system 102 storage of data operates as a black box, e.g., with no capability to read the data, as the encryption keys do not reside at the cloud system 102, but rather at the security server 106. When the cloud system 102 receives a request for a record 114, the cloud system 102 provides the record 114, e.g., with at least one data field in the record 114 is encrypted, and each encrypted data field has an associated encrypted field identifier. It is then up to the receiving party (e.g., the client device 108) to interact with the security server 106 for any needed encryption keys (e.g., to be requested based on associated encrypted field identifiers). In some implementations, a cloud provider can encrypt an entire file with a user's own key to prevent interception or access from outside entities. In some implementations, because a user's data and the associated security are stored apart from each other, an information owner can learn of any government subpoenas or attempts to access the data. This can provide an advantage over conventional cloud solutions, e.g., in which subpoenas may be issued directly to cloud providers who cannot tell their clients about the access. Other advantages can be provided by the cloud system 102. For example, a hacker would need to hack different environments, including a cloud solution and customer network (e.g., security server) to gain access to data. In another example, the security server can log any user that has asked to view or modify the secured data. In another example, the Government would have to contact the customer and ask for the encryption key. In particular, the Government would no longer be able to contact just the cloud provider and order the cloud provider not to disclose the existence of an order to submit data.

The security server 106, for example, can receive (e.g., in a request from the client device 108) a client certification key associated with a user 110 accessing the record 114 and at least one encrypted field identifier. Each encrypted field identifier can identify a particular one of the fields in the record 114 that is encrypted. Using the received information, the security server 106 can determine if the user 110 is authorized, on a field-by-field basis, to access the information. For example, the security server 106 can determine who is authorized to access individual fields in the record 114 based on the rights associated with the client certification key. If user authorization is confirmed, for example, the security server 106 can provide (e.g., to the client device 108) at least one decryption key associated with at least one of the at least one encrypted field identifier. In some implementations, requests received by the security server 106 can be for a single field, or requests can be grouped, e.g., for all fields in a particular record 114 or for multiple records 114.

Each client device 108, for example, can be a client system that includes a client application 118 for using received data, e.g., including records 114 stored in the cloud, and presenting the received record(s) 114 to the user 110. The client application 118 can collectively include a browser and/or other applications. In some implementations, the client application 118 can include at least one browser plug-in 120 for interfacing with one or more of the cloud system 102, the SSO system 104, the security server 106, and/or other components external from the client device 108.

A communication module 122, e.g., a component of the browser plug-in 120, can communicate with external components of the client device 108. Communication can include, for example, sending a sign-in request 130 to the SSO system 104 and receiving a personal record 132, e.g., a particular record 114, from the cloud system 102 in response to the sign-in request 130 or in response to some other request for data in the cloud. The communication module 122 can also request storage of records 114 in the cloud, such as initial storage of data in the cloud or to update one or more records 114 already been stored in the cloud. Communication can also include, for example, communication with the security server 106, such as to provide a client certification key 133 and one or more encrypted field identifiers 134 and to receive corresponding decryption keys 136 for encryption at the client device 108.

An encryption/decryption module 124, for example, can perform decryption of records 114 received from the cloud system 102. The encryption can be performed, for example, using decryption keys 136 received from the security server 106. The encryption/decryption module 124 can also encrypt fields in records 114 for initial storage in the cloud and upon any updates to the records, such as changes that occur at the client device 108. The encryption can be performed using encryption keys received from the security server 106 corresponding to the encrypted field identifier. For any given field that is encrypted, the client device 108 can provide a corresponding encrypted field identifier 134 to the security server 106 for storage.

The client device 108 further includes a processor 140. Although illustrated as the single processor 140 in FIG. 1, two or more processors 140 may be used according to particular needs, desires, or particular implementations of the environment 100. Each processor 140 may be a central processing unit (CPU), an application specific integrated circuit (ASIC), a field-programmable gate array (FPGA), or another suitable component. Generally, the processor 140 executes instructions and manipulates data to perform the operations of the client device 108. Specifically, the processor 140 executes the functionality required to send requests and/or data to components of the environment and to receive data from the components of the environment.

The client device 108 further includes a memory 142, or multiple memories 142. The memory 142 may include any type of memory or database module and may take the form of volatile and/or non-volatile memory including, without limitation, magnetic media, optical media, random access memory (RAM), read-only memory (ROM), removable media, or any other suitable local or remote memory component. The memory 118 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the client device 108. Additionally, the memory 142 may include any other appropriate data, such as VPN applications, firmware logs and policies, firewall policies, a security or access log, print or other reporting files, as well as others. Other components within the memory 142 are possible.

The illustrated environment of FIG. 1 also includes the client device 108, or multiple client devices 108. The client device 108 may be any computing device operable to connect to, or communicate with, at least the cloud system 102, the SSO system 104, and the security server 106. In general, the client device 108 comprises an electronic computer device operable to receive, transmit, process, and store any appropriate data associated with the environment 100 of FIG. 1.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The illustrated client device 108 is intended to encompass any computing device such as a smart phone, tablet computing device, PDA, desktop computer, laptop/notebook computer, wireless data port, one or more processors within these devices, or any other suitable processing device. For example, the client device 108 may comprise a computer that includes an input device, such as a keypad, touch screen, or other device that can accept user information, and an output device that conveys information associated with components of the environment 100 or the client device 108 itself, including digital data, visual information, or a graphical user interface (GUI) 150, as shown with respect to and included by the client device 108. The GUI 150 interfaces with at least a portion of the environment 100 for any suitable purpose, including generating a visual representation of a Web browser. In particular, the GUI 150 may be used to view and interact with data associated with records 114 stored in the cloud.

An example sequence of operations within the environment 100 can begin at stage 1, e.g., when the sign-in 130 is sent from the client device 108 to the SSO system 104. The communication can be handled by the communication module 122, for example. This can occur, for example, when the user 110a starts a session by logging into the SSO system 104.

At stage 2, for example, the cloud system 102 can provide the personal record 132 to the client device 108 in response to the user 110a logging into the SSO system 104 or in response to a request for the data for other purposes, e.g., for display within the GUI 150. When the browser plug-in 120 receives the record 114, the browser plug-in 120 can recognize that one or more fields in the received record are encrypted.

At stage 3, for example, for each (or groups of) encrypted field(s), the communication module 122, for example, can send the client certification key 133 (e.g., associated with the user 110a) and the encrypted field identifier(s) 134 to the security server 106. Each encrypted field identifier 134 can correspond to information already stored at the security server 106 for each field known by the security server 106 and for which client certification keys 133 exist for each user or group having access to the field.

At stage 4, for example, the security server 106 can return, to the client device 108, a decryption key 136 for each of the fields for which the user 110a has authorization. For any given record 114, for example, users 110a and 110b may have different authorizations, meaning users 110a and 110b would have access to different ones of fields in a given record 114. As such, in a request sent by either of client devices 108a, 108b associated with users 110a, 110b, respectively, the client certification keys 133 sent to the security server 106 would typically be different. Further, sets of decryption keys 136 can be received at the client devices 108a, 108b for use by the users 110a, 110b and the encrypted fields to which they have access.

At stage 5, for example, the encryption/decryption module 124 can decrypt individual fields in the personal record 132 using the received decryption keys 136. At this time, the data can be presented in its decrypted form, such as in the GUI 150.

Figure 2:
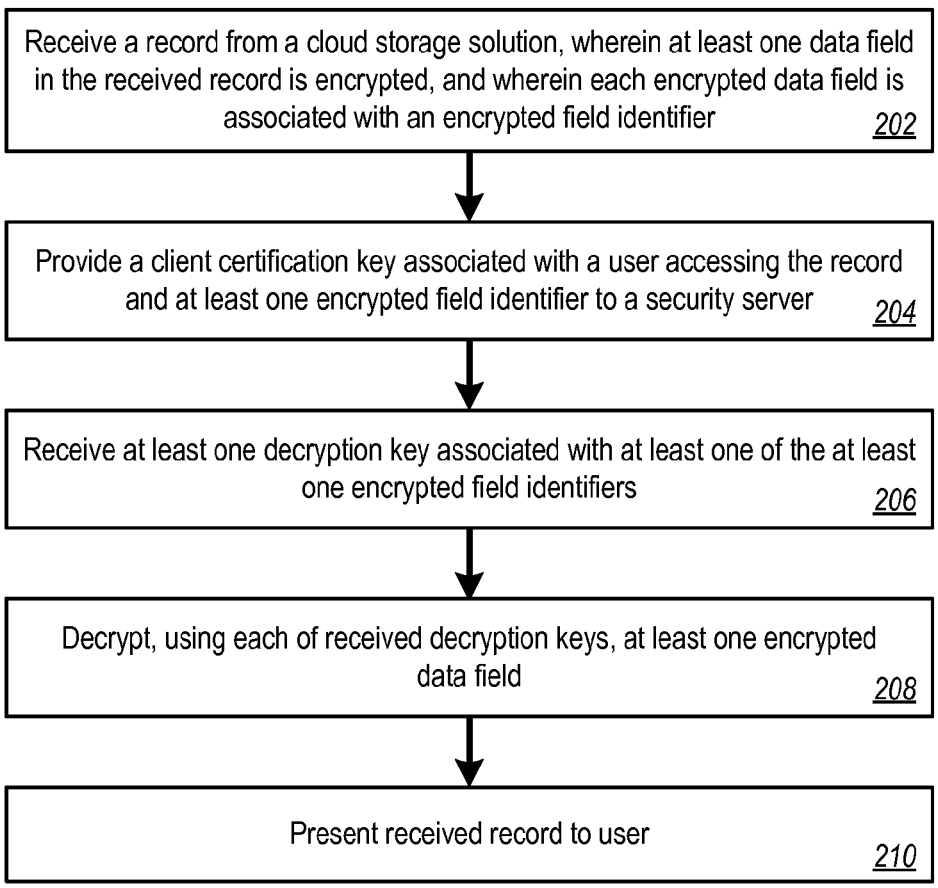
FIG. 2 is a flowchart of an example method for decrypting a data record received from the cloud.

FIG. 2 is a flowchart of an example method 200 for decrypting a data record received from the cloud. For clarity of presentation, the description that follows generally describes method 200 in the context of FIG. 1. However, it will be understood that the method 200 may be performed, for example, by any other suitable system, environment, software, and hardware, or a combination of systems, environments, software, and hardware as appropriate. For example, the client device 108 and/or its components can be used to execute the method 200, e.g., using information accessed from the cloud system 102 and the security server 106.

At 202, a record is received from a cloud storage solution, wherein at least one data field in the received record is encrypted, and wherein each encrypted data field is associated with an encrypted field identifier. For example, the client device 108a can receive the personal record 132, such as in response to the sign-in 130. The personal record 132 that is received can have one or more individual fields that are encrypted. In some implementations, the level of encryption associated with user access of the personal record 132 can be set by an administrator, a record keeper, or some other user, as described above.

At 204, a client certification key associated with a user accessing the record and at least one encrypted field identifier are provided to a security server. For example, for each encrypted field in the personal record 132, the communication module 122 can send the client certification key 133

(associated with the user 110a) and the encrypted field identifier 134 to the security server 106.

In some implementations, the client certification key corresponds to a single sign-on (SSO) authorization, and the SSO authorization allows access to the received record from the cloud storage solution. For example, the client certification key 133 that the communication module 122 sends to the security server 106 can be unique to the user 110a, or unique to a group to which the user 110a belongs for which the user is associated with respect to accessing the fields in the personal record 132.

In some implementations, the security server 106 performs one or more operations, e.g., to return decryption keys 136 in response to receiving the client certification key 133 and encrypted field identifier 134. For example, the operations include determining, for each received encrypted field identifier 134, whether the user (e.g., the user 110a) associated with the client certification key 133 is authorized to view the decrypted contents of the corresponding encrypted data field (e.g., in the personal record 132). The operations also include providing, for each encrypted field identifier 134 for which the user associated with the client certification key 133 is authorized, the decryption key 136 associated with the encrypted field identifier 134.

In some implementations, the record is received at a client system, and the client system is associated with a local program coordinating access with the security server. For example, the client device 108a associated with the user 110a can receive the personal record 132 from the cloud system 102. In this example, the communication module 122 of the browser plug-in 120 can communicate with the security server 106.

In some implementations, the local program is a client browser plug-in, and the client browser plug-in is operable when executed to communicate with the security server and decrypt the encrypted field associated with each encrypted field identifier for which an associated decryption key is received. For example, the encryption/decryption module 124 can use the received decryption key 136 to decrypt the field in the personal record 132 that corresponds to the encrypted field identifier 134.

In some implementations, the determination of whether the user associated with the client certification key is authorized to view the decrypted contents of an encrypted data field is based on the client certification key of the user being associated with at least one of a role of the user, a predefined authorization for the user, the user's region, or the user's membership in a group, family, team, or department, or one or more of the user's role, education, certification, or location. For example, the security server 106 can determine authorization based on whether the user 110a has a certain business role or application role for which users having that role are authorized. In another example, the security server 106 can determine authorization based on whether the user 110a has access to the specific field in the record.

In some implementations, a first encrypted data field is authorized for access by a single user (e.g., a first user), and a different second encrypted data field is authorized for access by a set of users. A different third encrypted data field may be authorized for access only by a different single user (e.g., a second different user). For example, the received personal record 132 may have plural encrypted fields, and one or more of the fields may have authorization defined for any combination of the user 110a, the user 110b, and other users 110.

At 206, at least one decryption key associated with at least one of the at least one encrypted field identifier is received.

For example, the user device 208a can receive the decryption key 136 from the security server 106. There can be one decryption key 136 received for each encrypted field identifier 134 that is provided to the security server 106.

At 208, using each of received decryption key, at least one encrypted data field is decrypted. The encryption/decryption module 124, for example, can decrypt a particular field in the personal record 132 using the received decryption key 136.

At 210, the received record is presented to the user accessing the record. The client application 118, for example, can present data in the personal record 132 in the GUI for presentation to the user 110a. When presented, any fields received in an encrypted state from the cloud system 102 are presented in decrypted form (e.g., upon authorization of the user 110a for that field).

In some implementations, the client certification key associated with the user accessing the record provides authorized access to fewer than all of the encrypted data fields within the record, and presenting the received record to the user includes presenting at least one data field without decrypting the at least one data field. For example, the client certification key 133 that the communication module 122 sends to the security server 106 can be specific to one or more individual fields (e.g., but not necessarily all) in the personal record 132. For any encrypted field for which the corresponding encrypted field identifier 134 was not provided to the security server 106 or for which authorization of the user 110a failed, the field can be presented in decrypted form.

In some implementations, presenting the received record to the user includes, when the user does not have authorization to see a particular data field, presenting a placeholder field value in lieu of encrypted information. For example, instead of presenting encrypted information when displaying a field, the client application 118 can present the field using placeholder values such as identifying text (e.g., "ENCRYPTED" or "CLASSIFIED"), asterisks, X's, question marks, or in some other predetermined way (e.g., including special fonts or colors).

In some implementations, the method 200 further includes operations for encrypting data before sending the data to the cloud. For example, a record to be stored in the cloud can be identified, e.g., at the client device 108. Settings associated with the record can be identified, e.g., by the user 110, including which of the fields are to be encrypted and using which particular keys. A client certification key, e.g., the client certification key 133, can be provided by the browser plug-in 120 to the security server for encryption. The client device 108 can receive, from the security server 106, an encryption key based on the client certification key and an authorization to encrypt. The encryption/decryption module 124 can encrypt particular fields prior to storage in the cloud. The communication module 120 can send the record to the cloud system 102 for storage.

In some implementations, the method 200 further includes determining that an update has occurred on a field value in the record, encrypting the field value, and sending the record to the cloud storage solution for storage. For example, if the user 110a makes a change to the value of an encrypted field of the personal record 132 and submits the data for storage in the cloud, then the encryption/decryption module 124 can encrypt the particular field in the personal record 132 using an encryption key requested from the security server 106 prior to sending the record back to the cloud.

In some implementations, the cloud storage solution encrypts the record in its entirety in the cloud. For example, the cloud system 102 can encrypt the record 114 in its entirety, in addition to field-level encryption performed at the client device 108.

Figure 3:
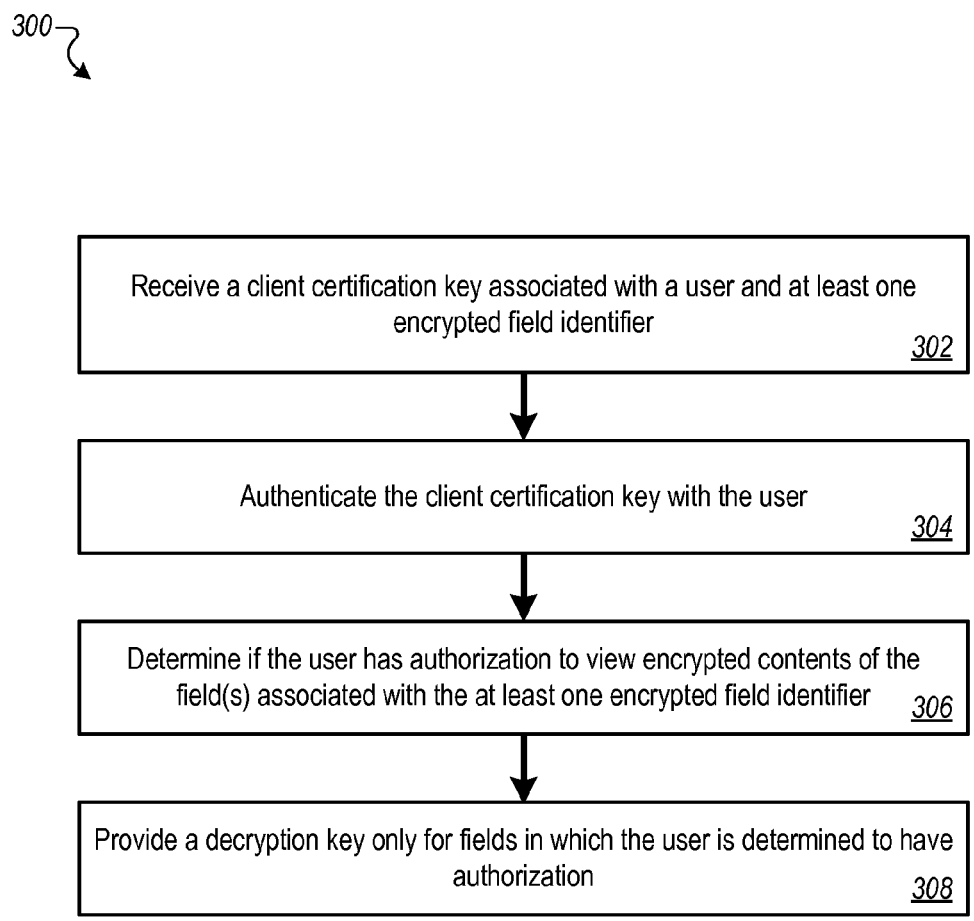
FIG. 3 is a flowchart of an example method for decryption of an encrypted record stored in the cloud, from the view of a security server.

FIG. 3 is a flowchart of an example method 300 for decryption of an encrypted record stored in the cloud, from the view of a security server. For clarity of presentation, the description that follows generally describes method 300 in the context of FIG. 1. However, it will be understood that the method 300 may be performed, for example, by any other suitable system, environment, software, and hardware, or a combination of systems, environments, software, and hardware as appropriate. For example, the security server 106 and/or its components can be used to execute the method 300.

At 302, a client certification key associated with a user and at least one encrypted field identifier are received. For example, the security server 106 can receive the client certification key 133 and encrypted field identifiers 134 from the client device 108.

At 304, the client certification key is authenticated with the user. For example, the security server 106 can use information stored at the security server 106 to determine if the user identified by the client certification key 133 is authenticated.

At 306, a determination is made whether the user has authorization to view encrypted contents of field(s) associated with the at least one encrypted field identifier. For example, the security server 106 can determine if the identified user is authorized to use the encrypted fields associated with the encrypted field identifiers 134.

At 308, a decryption key is provided only for fields in which the user is determined to have authorization. For example, the security server 106 can provide one or more decryption keys 136 to the client device 108. The provided decryption keys 136 would only include decryption keys for fields for which the user is authorized.

The preceding figures and accompanying description illustrate example processes and computer implementable techniques. But example environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, example environment 100 may use processes with additional operations, fewer operations, and/or different operations, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method for decrypting encrypted data received from a cloud, comprising:
   receiving a record from a cloud storage solution at a client system, wherein at least one data field in the received record is encrypted, wherein each encrypted data field is associated with an encrypted field identifier, and wherein the encrypted data fields were encrypted external to the cloud storage solution and prior to storage in the cloud storage solution;
   providing a client certification key associated with a user accessing the record and at least one encrypted field identifier to a security server, wherein the security server is separate from the cloud storage solution and wherein decryption keys associated with the encrypted data fields are stored only on the security server, and wherein the client system is associated with a local program coordinating access with the security server and operable when executed to communicate with the security server;
   receiving at least one decryption key associated with at least one of the at least one encrypted field identifier from the security server;
   decrypting, by the local program using each of the received decryption keys, at least one encrypted data field; and
   presenting the received record to the user.

2. The computer-implemented method of claim 1, wherein the client certification key corresponds to a single sign-on (SSO) authorization, wherein the SSO authorization allows access to the received record from the cloud storage solution.

3. The computer-implemented method of claim 1, wherein the client certification key associated with the user accessing the record provides authorized access to fewer than all of the encrypted data fields within the record, and wherein presenting the received record to the user includes presenting at least one data field without decrypting the at least one data field.

4. The computer-implemented method of claim 1, wherein the security server performs one or more operations, including:
   determining, for each encrypted field identifier, whether the user associated with the client certification key is authorized to view decrypted contents of the corresponding encrypted data field; and
   providing, for each encrypted field identifier for which the user associated with the client certification key is authorized, a decryption key associated with the encrypted field identifier.

5. The computer-implemented method of claim 1, wherein the local program is a client browser plug-in.

6. The computer-implemented method of claim 4, wherein the determination of whether the user associated with the client certification key is authorized to view the decrypted contents of an encrypted data field is based on the client certification key of the user being associated with at least one of a role of the user, a pre-defined authorization, the user's region, or the user's membership in a group, family, team, or department, or one or more of the user's role, education, certification, or location.

7. The computer-implemented method of claim 6, wherein a first encrypted data field is authorized for access by a single first user, and wherein a different second encrypted data field is authorized for access by a different second user.

8. The computer-implemented method of claim 1, wherein a level of encryption associated with user access for the record is set using inputs from an administrator or a record keeper.

9. The computer-implemented method of claim 1, wherein presenting the received record to the user includes, when the user does not have authorization to see a particular data field, presenting a placeholder field value in lieu of encrypted information.

10. The computer-implemented method of claim 1, further comprising:
    identifying a record to be stored in the cloud;
    identifying settings associated with the record, including which of the fields are to be encrypted and using which particular keys;
    providing, to the security server, a client certification key for encryption;
    receiving, from the security server, an encryption key based on the client certification key and an authorization to encrypt;
    encrypting particular fields prior to storage in the cloud; and
    sending the record to the cloud for storage.

11. The computer-implemented method of claim 1, further comprising:
    determining that an update has occurred on a field value in the record;
    encrypting the field value; and
    sending the record to the cloud storage solution for storage.

12. The computer-implemented method of claim 1, wherein the cloud storage solution encrypts the record in its entirety in the cloud.

13. A computer system, comprising:
    memory operable to store content, including static and dynamic content; and
    at least one hardware processor interoperably coupled to the memory and operable to perform instructions to:
        receive a record from a cloud storage solution at a client system, wherein at least one data field in the received record is encrypted, wherein each encrypted data field is associated with an encrypted field identifier, and wherein the encrypted data fields were encrypted external to the cloud storage solution and prior to storage in the cloud storage solution;
        provide a client certification key associated with a user accessing the record and at least one encrypted field identifier to a security server, wherein the security server is separate from the cloud storage solution and wherein decryption keys associated with the encrypted data fields are stored only on the security server, and wherein the client system is associated with a local program coordinating access with the security server and operable when executed to communicate with the security server;
        receive at least one decryption key associated with at least one of the at least one encrypted field identifier from the security server;
        decrypt, by the local program using each of the received decryption keys, at least one encrypted data field; and
        present the received record to the user.

14. The computer system of claim 13, wherein the client certification key corresponds to a single sign-on (SSO) authorization, wherein the SSO authorization allows access to the received record from the cloud storage solution.

15. The computer system of claim 13, wherein the client certification key associated with the user accessing the record provides authorized access to fewer than all of the encrypted data fields within the record, and wherein presenting the received record to the user includes presenting at least one data field without decrypting the at least one data field.

16. The computer system of claim 13, wherein the security server performs one or more operations, including:
    determining, for each encrypted field identifier, whether the user associated with the client certification key is authorized to view decrypted contents of the corresponding encrypted data field; and
    providing, for each encrypted field identifier for which the user associated with the client certification key is authorized, a decryption key associated with the encrypted field identifier.

17. The computer system of claim 13, wherein the local program is a client browser plug in.

18. The computer system of claim 16, wherein the determination of whether the user associated with the client certification key is authorized to view the decrypted contents of an encrypted data field is based on the client certification key of the user being associated with at least one of a role of the user, a pre-defined authorization, the user's region, or the user's membership in a group, family, team, or department, or one or more of the user's role, education, certification, or location.

* * * * *